(12) United States Patent
Barber et al.

(10) Patent No.: US 9,862,013 B2
(45) Date of Patent: Jan. 9, 2018

(54) APPARATUS FOR DEFORMATION OF SOLID SECTIONS

(71) Applicant: Shear Form, Inc., Bryan, TX (US)

(72) Inventors: Robert E. Barber, Bryan, TX (US); Karl T. Hartwig, College Station, TX (US)

(73) Assignee: Shear Form, Inc., Bryan, TX (US)

( * ) Notice: Subject to any disclaimer, the term of this patent is extended or adjusted under 35 U.S.C. 154(b) by 624 days.

(21) Appl. No.: 13/868,898

(22) Filed: Apr. 23, 2013

(65) Prior Publication Data

US 2013/0276501 A1 Oct. 24, 2013

Related U.S. Application Data

(60) Provisional application No. 61/637,203, filed on Apr. 23, 2012.

(51) Int. Cl.
| | |
|---|---|
| *B21C 23/00* | (2006.01) |
| *B30B 11/26* | (2006.01) |
| *B29C 47/00* | (2006.01) |
| *B28B 17/00* | (2006.01) |
| *B29C 47/54* | (2006.01) |

(52) U.S. Cl.
CPC ............ *B21C 23/00* (2013.01); *B21C 23/001* (2013.01); *B28B 17/0009* (2013.01); *B29C 47/00* (2013.01); *B29C 47/54* (2013.01); *B30B 11/26* (2013.01)

(58) Field of Classification Search
CPC ....... B21C 23/00; B21C 23/001; B21C 23/21; B21C 23/211; B21C 23/212; B21C 23/217; B21C 23/218; B21C 25/02; B21C 25/04; B21C 26/00; B30B 11/22; B30B 11/26; B28B 17/0009; B28B 3/26
USPC .......................................... 72/253.1
See application file for complete search history.

(56) References Cited

U.S. PATENT DOCUMENTS

| | | | | |
|---|---|---|---|---|
| 2,253,003 | A * | 8/1941 | Whipple ................ | B30B 11/04 264/120 |
| 3,369,385 | A * | 2/1968 | Murphy et al. ................. | 72/272 |
| 5,400,633 | A * | 3/1995 | Segal et al. ..................... | 72/272 |
| 6,047,584 | A * | 4/2000 | Filippo ................. | B21D 41/00 72/116 |
| 7,140,222 | B2 * | 11/2006 | Park ..................... | B21C 23/001 72/253.1 |
| 7,150,172 | B2 * | 12/2006 | Nakazato ......................... | 72/75 |
| 2012/0178892 | A1 * | 7/2012 | Van Citters ......... | B29C 47/0002 526/352 |

* cited by examiner

*Primary Examiner* — Teresa M Ekiert
(74) *Attorney, Agent, or Firm* — Tumey L.L.P.

(57) ABSTRACT

An equal channel angular extrusion tool comprising a punch assembly, a die set assembly, a base assembly, and a bottom slider assembly. The punch assembly comprises a punch, a punch nose, and a punch trolley. The die set assembly comprises an inlet channel and a removable core. The base assembly comprises a lifting mechanism which further comprises a die lift cylinder and a hold down ram. The bottom slider assembly comprises an ejection ram. The tool also includes a billet. The billet may be disposed in the bottom slider assembly. Severe plastic deformation is applied to the billet in the bottom slider assembly.

10 Claims, 3 Drawing Sheets

APPARATUS FOR DEFORMATION OF SOLID SECTIONS

CROSS-REFERENCE TO RELATED APPLICATIONS

This application is a non-provisional application that claims the benefit of U.S. Application Ser. No. 61/637,203 filed on Apr. 23, 2012, which is incorporated by reference herein in its entirety.

STATEMENT REGARDING FEDERALLY SPONSORED RESEARCH OR DEVELOPMENT

This application was made with government support under the DOE grant reference number DE-FG02-08ER85026.

BACKGROUND OF THE INVENTION

Field of the Invention

This invention relates to the field of processing solids and more specifically to the field of severe plastic deformation.

Background of the Invention

There are a variety of processes for working with solid materials, such as metal and plastics. For many applications, these processes include plastic deformation of the solid materials. Deformation refers to a permanent or temporary change, in response to an applied force, in the shape of a solid volume element in a material.

Many different methods have been developed for deforming solid materials. Such methods may include applying bend or contact forces. A drawback to conventional deformation methods is the potential inefficiency in refining the microstructure of solid materials during plastic deformation. Further drawbacks to conventional deformation methods include inhomogeneous strain with consequent inhomogeneous microstructures from the plastic deformation and poor predictability of the outcome of subsequent heat treatment and/or forming operations such as wire drawing, sheet rolling, forging, drawing, and the like.

Consequently, there is a need for improved processes for the deformation of solid materials.

BRIEF SUMMARY OF SOME OF THE PREFERRED EMBODIMENTS

These and other needs in the art are addressed in an embodiment by an equal channel angular extrusion tool. The tool includes a punch assembly, a die set assembly, a base assembly, and a bottom slider assembly. The punch assembly comprises a punch, a punch nose, and a punch trolley. The die set assembly comprises an inlet channel and a removable core. The base assembly comprises a lifting mechanism which further comprises a die lift cylinder and a hold down ram. The bottom slider assembly comprises an ejection ram. The tool also includes a billet. The billet may be disposed in the bottom slider assembly. Severe plastic deformation is applied to the billet in the bottom slider assembly.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

In an embodiment an equal channel angular extrusion tool deforms solid materials. In embodiments, the tool uses the equal channel angular extrusion process for deformation of the solid materials. The tool may deform solid materials of any size. In some embodiments, the tool deforms solid materials that are large. For example, the tool may deform materials (i.e., solid materials) with a diameter from about one-sixteenth of an inch to about twenty-four inches in diameter and with a length from about five-eighths of an inch to about two-hundred and forty inches, or alternatively the tool may deform materials (i.e., solid materials) with a diameter from about one-sixteenth of an inch to about seven inches in diameter and with a length from about five-eighths of an inch to about forty inches. In an embodiment, the tool imparts severe plastic deformation via simple shear into the solid material (e.g., the workpiece), which may refine and homogenize the microstructures of the work piece. In embodiments, such severe plastic deformation provided by the tool may result in improved predictability of the outcome of subsequent heat treatment and/or forming operations such as forging, extrusion, deep drawing, wire drawing, sheet rolling, and/or like operations.

Figure 1:
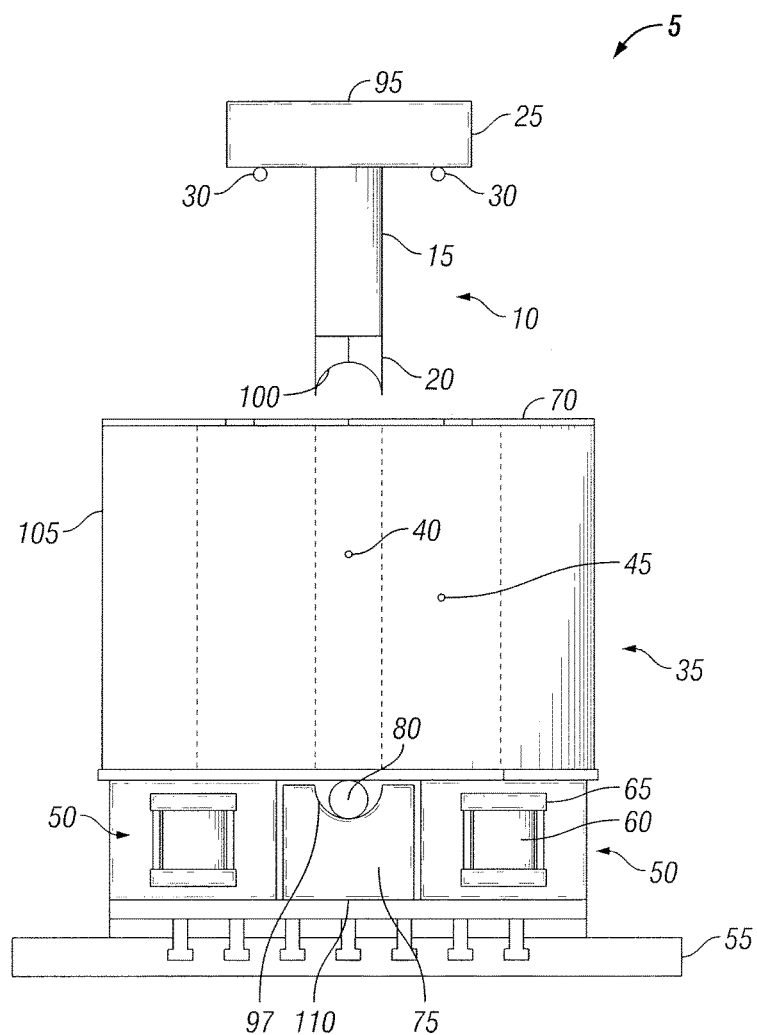
FIG. 1 illustrates a front view of an embodiment of the equal channel angular extrusion tool.

FIG. 1 illustrates an embodiment of the equal channel angular extrusion tool 5. In embodiments, the equal channel angular extrusion tool 5 comprises a punch assembly 10. The punch assembly 10 comprises a punch 15, a punch nose 20, and a punch trolley 25. In some embodiments, the punch assembly 10 is mounted on one or more rollers 30, which may facilitate insertion of a billet 80 and facilitate location of the punch assembly 10 above the inlet channel 40. In embodiments, the punch nose 20 may comprise a hemi-cylindrical end configuration 100. The hemi-cylindrical end configuration 100 may allow predictability of a fully worked zone, facilitate uniform deformation of round cross-section sections, and enable efficient control of billet 80 orientation. In alternative embodiments, the punch nose 20 may comprise alternative shapes as suitable for alternative applications of any type including but not limited to shear and extrusion applications. The punch nose 20 may further comprise a split punch nose 20, which may eliminate the possibility of punch 15 longitudinal cracking and fracture. The punch assembly 10 functions as a press and is lowered into the die set assembly 35. In some embodiments as shown, punch trolley 25 is substantially perpendicular to punch 15. In embodiments, punch trolley 25 provides a surface 95 for application of pressure to punch assembly 10.

Figure 2:
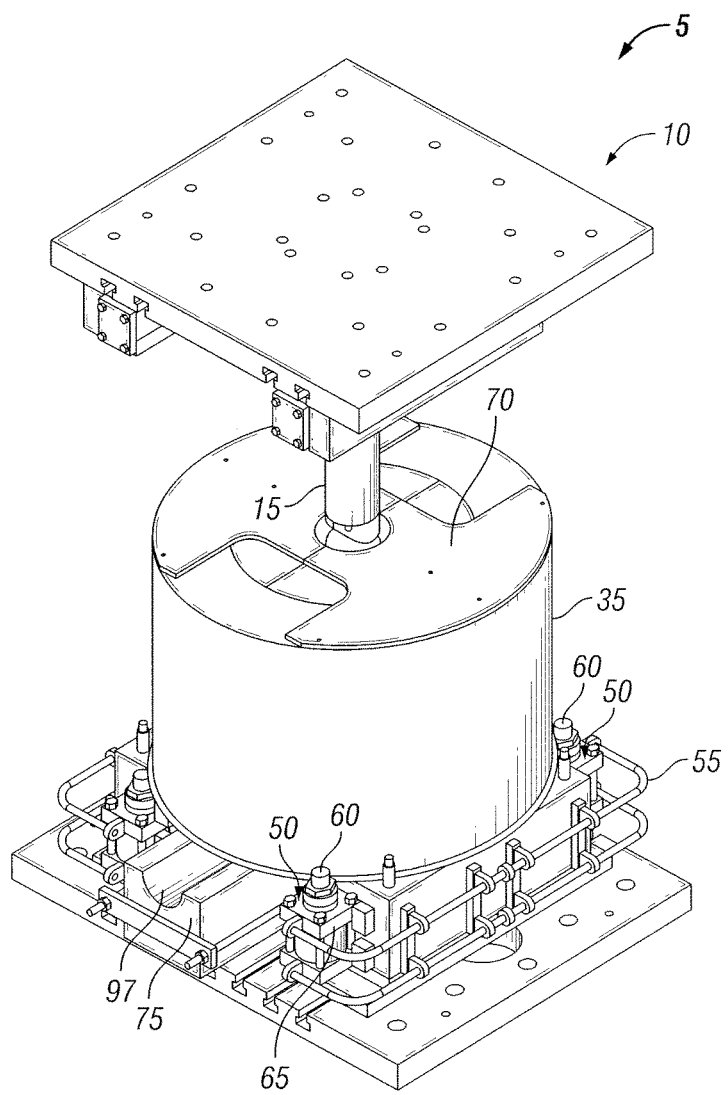
FIG. 2 illustrates a perspective view of an embodiment of the equal channel angular extrusion tool in an inactive state.
Figure 3:
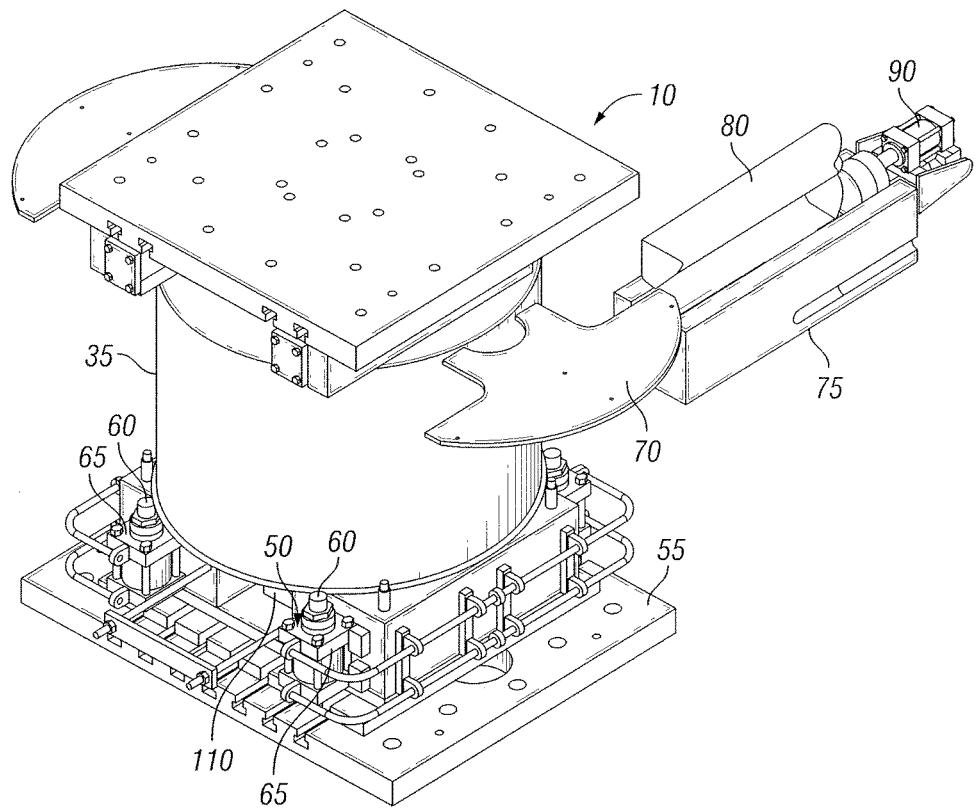
FIG. 3 illustrates a perspective view of an embodiment of the equal channel angular extrusion tool for deformation of solids at the ejection state after extrusion.

As further shown in FIG. 1, in embodiments, the equal channel angular extrusion tool 5 comprises die set assembly 35. Die set assembly 35 is a die set that includes a removable core 45 which comprises inner tool components (not illustrated). In some embodiments, the removable core 45 may allow for future changes in work piece cross-section, liner rework, repair, and the like. In embodiments, the die set assembly 35 also includes an inlet channel 40. The punch assembly 10 may be easily positioned above the inlet channel 40 via the punch trolley 25 and roller 30. As seen in FIGS. 2 and 3, embodiments of the die set assembly 35 may further comprise ram stop plate 70. In some embodiments, ram stop plate 70 may comprise two hemi-cylindrical plates, the interiors of which create an opening in the die set assembly 35 in which the punch assembly 10 may be disposed therethrough. In an embodiment, ram stop plate 70 is disposed on an opposing end of the die set assembly 35 from the base assembly 55. Ram stop plate 70 may be composed of any suitable material (e.g. steel). In embodiments, the die set assembly 35 may also include an internal tapered interference fit to pre-stress the liner (not shown). Without limitation, the internal tapered interference fit may prevent tool component cracking. In some embodiments, the die set assembly 35 has inner core 105 (i.e., interior) of a size that may allow for future workpiece size increases. In embodiments, the equal channel angular extrusion tool 5 has the die set assembly 35 and the base assembly 55 as separate components. Without limitation, such separation may facilitate extraction of the bottom slider assembly 75 and billet 80 after extrusion. In an embodiment, the lifting mechanism 50 may raise the die set assembly 35 above the base assembly 55 for easy billet 80 drop-out and extraction. Lifting mechanism 50 may be any mechanism suitable for raising (i.e., lifting) the die set assembly 35.

In addition, as shown in FIG. 1, embodiments of the equal channel angular extrusion tool 5 comprise a base assembly 55. As noted above, in an embodiment, the base assembly 55 may further comprise a lifting mechanism 50. The lifting mechanism 50 may comprise any type of lifting mechanism such as a hydraulic lifting mechanism. As an example of one embodiment, as shown in FIGS. 2 and 3, lifting mechanism 50 further comprises die lift cylinder 60 and hold down ram 65. Embodiments of the equal channel angular extrusion tool 5 may comprise a plurality of lifting mechanisms 50. In embodiments as shown, equal channel angular extrusion tool 5 has more than one lifting mechanism 50. In an embodiment as shown, equal channel angular extrusion tool 5 has four lifting mechanisms 50. In embodiments, equal channel angular extrusion tool 5 has four lifting mechanisms 50 spaced about equally apart. Die lift cylinder 60 facilitates removal of the bottom slider assembly 75 and billet 80 after extrusion or any other type of materials processing. In embodiments, the base assembly 55 may also comprise a wear plate 110 for the bottom slider assembly 75 to reduce friction. The wear plate 110 is located on the base assembly 55 opposite the underside of the bottom slider assembly 75. The wear plate 110 may be composed of any sufficient material having properties that are durable and also reduce friction (e.g. bronze, hardened steel, or oil impregnated bronze).

As illustrated in FIGS. 1, 2, 3, and 4, in embodiments, the equal channel angular extrusion tool 5 comprises a bottom slider assembly 75. The bottom slider assembly 75 has an ejection ram 90 to dislodge and eject a billet 80 from bottom slider assembly 75. In an embodiment, bottom slider assembly 75 further comprises fork lift pockets (not shown) for handling. In embodiments, bottom slider assembly 75 may further comprise a hemi-cylindrical groove 97, which may facilitate maintaining the billet 80 shape. In embodiments, the hemi-cylindrical groove 97 may shape or match the shape of the work piece.

FIG. 2 illustrates an embodiment of the equal channel angular extrusion tool 5 in an inactivated state. In this state, the bottom slider assembly 75 rests in the base assembly 55 without a billet 80. The punch assembly 10 is in an elevated position above the inlet channel 40 of the die set assembly 35.

FIG. 3 illustrates an embodiment of the equal channel angular extrusion tool 5 immediately after ejection of the bottom slider assembly 75 from the base assembly 55. Disposed within the bottom slider 75 is the processed billet 80, which has been ejected from the bottom slider assembly 75 through activation of ejection ram 90. In this state, the punch assembly 10 has been fully lowered into the inlet channel 40 of the die set assembly 35.

Figure 4:
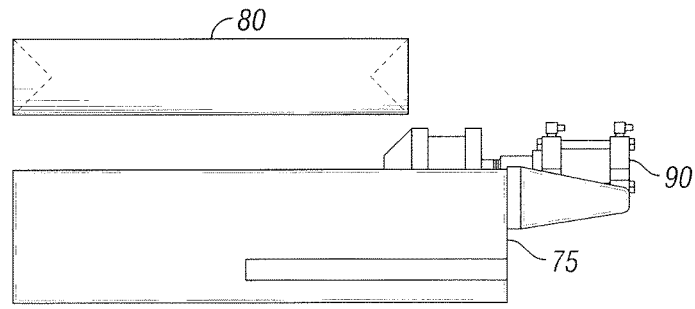
FIG. 4 illustrates a cross-section of an embodiment of the bottom slider assembly of the equal channel angular extrusion tool.

FIGS. 3 and 4 illustrate an embodiment of equal channel angular extrusion tool 5 having billet 80. Equal channel angular extrusion tool 5 provides severe plastic deformation to billet 80. In embodiments, billet 80 has micro-structural non-uniformities prior to application of equal channel angular extrusion tool 5. Without limitation, equal channel angular extrusion tool 5 transforms the micro-structural non-uniformities to a uniform micro-structure. It is to be understood that a uniform micro-structure refers to a micro-structure that has substantially the same properties and structure throughout the billet 80. The micro-structure may be substantially uniform throughout the entirety of the thickness of the billet 80. Further, without limitation, the equal channel angular extrusion tool 5 provides a uniform plastic strain throughout billet 80, which provides the uniform micro-structure in the material comprising billet 80. In addition, without limitation, equal channel angular extrusion tool 5 provides control over the resulting texture of the material of billet 80 after billet 80 is processed by equal channel angular extrusion tool 5.

The material of billet 80 may be any material suitable for severe plastic deformation. In embodiments, the material is metal, ceramic, plastic, composite, or any combinations thereof. In embodiments, the billet may be solid, layered, filamentary, particulate, encapsulated, or any combination thereof. In some embodiments, the metal is a transition metal, metal alloy, or any combination thereof. For instance, an embodiment includes the metal comprising niobium. In another embodiment, the metal is tantalum. The material may have any desired configuration. For instance, the material may be hollow or solid. The material may have a circular shaped cross section, a hexagonal cross section, an octagonal cross section, a square shaped cross section, a rectangular shaped cross section, and the like. Without limitation, examples of material include piping, bar, tubing, plate, hollow plate, and the like. In an embodiment, the solid material is a round, cross-section bar. The deformation may include any type of deformation. In an embodiment, the deformation mechanism is plastic simple shear deformation.

Additionally, the tool provides a load on the material (i.e., billet) from about ten tons to about five thousand tons, alternatively from about one hundred tons to about two-thousand five hundred tons.

In embodiments as shown in FIGS. 1-4, the equal channel angular extrusion tool 5 performs severe plastic deformation to materials (i.e., billet 80). The equal channel angular extrusion process comprises loading a billet 80 into the bottom slider assembly 75 and inserting the bottom slider assembly 75 into the base assembly 55. The process further includes positioning the punch assembly 10 above the inlet channel 40 via the punch trolley 25 and roller 30. When the punch assembly 10 is located above the inlet channel 40 of the die set assembly 35, the positioning is halted. The punch 15 may then be pressed into the inlet channel 40 of the die set assembly 35. Once the punch 15 is lowered, the punch nose 20 performs severe plastic deformation on the billet 80 which is disposed within the bottom slider assembly 75 within base assembly 55. After severe plastic deformation to the billet 80 has concluded, the lifting mechanism 50 of the base assembly 5 is activated via the die lift cylinder 60 and the hold down ram 65. The bottom slider assembly 75 may then be removed from the base assembly 55, and the processed billet 80 may be ejected from the bottom slider assembly 75 via the ejection ram 90, which is located on bottom slider assembly 75.

In embodiments, the equal channel angular extrusion tool 5 may subject the solid material (i.e., a round cross-section bar workpiece) to severe plastic deformation when the solid material is pushed through the tool. Without limitation, the design of the tool enables high product yield, ease of extrusion, ease of billet 80 removal from the tool after extrusion, rotation of the billet 80 about its longitudinal axis between extrusion passes for multi-pass processing, tool component reconfiguration for extrusion of solid materials with different cross-section shapes (i.e, square or hexagonal cross-sections), and long life operation.

In embodiments, a purpose of the equal channel angular extrusion tool 5 is to impart severe plastic deformation via simple shear to the billet 80, which may allow the micro-structure to be refined and homogenized. Without limitation, because of micro-structural refinement, the resulting processed billet 80 may be more predictable in subsequent heat treatment and deformation operations. Further, without limitation, the resulting processed billet 80 may have near-isotropic mechanical, microstructural, physical, and chemical properties. Additionally, the product material may possesses a reduced grain size which may improve additional subsequent reshaping operations including forging, extrusion, wire drawing, deep drawing, sheet rolling, and the like.

In embodiments, the equal channel angular extrusion tool 5 is designed to allow quick and simple loading and ejection of processed solid material (i.e., bars, billets). In an embodiment, hydraulic hold down ram 65 is positioned to handle tool components such as the large tool components as well as loads so that the work to operate the tool may be reduced. Also, the design of the equal channel angular extrusion tool 5 is such that the tool may be modified. The modification may be for any desired purpose. In some embodiments, the tool may be modified to accommodate different cross-section shapes if so desired. Without limitation, the design allows the modification to be accomplished at a low cost.

The tool has a plurality of advantages. Without limitation, advantages include a sliding punch mechanism via the punch trolley 25, which may allow a shorter press stroke, less press "daylight", and self-centering punch 15 alignment. Advantages also include a hemi-cylindrical punch nose 20 that may increase product (work piece) yield for cylindrical work pieces. In addition, advantages include a split punch nose 20, which may eliminate the possibility for punch 15 longitudinal cracking and fracture. Additional advantages include a channel intersection with a ninety degree corner and cylindrical profile, which may increase extrusion efficiency and increase product yield. Moreover, advantages include inlet channel 40 necking near the channel intersection plane, which may reduce cross section size, reduce flash, and thus increase product yield by eliminating machining waste. Further, advantages include the tool having a bottom slider assembly 75 with a hemi-cylindrical groove 97, which may decrease friction loads, enable less press capacity, and increase product yield. Additional advantages of the bottom slider assembly 75 design include allowing for future application of a back pressure upgrade to improve work-piece material deformability during extrusion. A further advantage includes a hydraulic ejection ram 90 on the leading end of the bottom slider assembly 75, which may facilitate billet 80 extraction following extrusion.

It should be understood that the embodiments of the present invention are described in terms of "comprising," "containing," or "including" various components or steps, the embodiments can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. An equal channel angular extrusion assembly for severe plastic deformation of materials comprising:
    a punch assembly, wherein the punch assembly comprises a punch, a punch nose and a punch trolley;
    a die set assembly, wherein the die set assembly is configured to produce a billet, and wherein the billet is cylindrically shaped;
    a base assembly, wherein the base assembly comprises a lifting mechanism and a wear plate; and
    a bottom slider assembly, wherein the bottom slider assembly moves laterally in respect to the punch assembly and wherein the bottom slider assembly comprises an ejection ram and is detachable from the base assembly.

2. The equal channel angular extrusion assembly of claim 1, wherein the punch trolley comprises a roller.

3. The equal channel angular extrusion assembly of claim 1, wherein the punch nose comprises a split punch nose.

4. The equal channel angular extrusion assembly of claim 1, wherein the punch nose comprises a hemi-cylindrical end configuration.

5. An equal channel angular extrusion assembly for severe plastic deformation of materials comprising:
    a punch assembly;
    a die set assembly, wherein the die set assembly is configured to produce a billet, and wherein the billet is cylindrically shaped, wherein the die set assembly comprises an inlet channel, a ram stop plate, and an inner core;
    a base assembly, wherein the base assembly comprises a lifting mechanism and a wear plate; and
    a bottom slider assembly, wherein the bottom slider assembly moves laterally in respect to the punch assembly and wherein the bottom slider assembly comprises an ejection ram and is detachable from the base assembly.

6. The equal channel angular extrusion assembly of claim 5, wherein at least a portion of the punch assembly is moveable within the inlet channel.

7. The equal channel angular extrusion assembly of claim 5, wherein the ram stop plate is disposed on an opposing end of the die set assembly from the base assembly.

8. The equal channel angular extrusion assembly of claim 5, wherein inner tool components are disposed within the inner core.

9. The equal channel angular extrusion assembly of claim 5, wherein the inner core comprises an internal tapered interference fit.

10. An equal channel angular extrusion assembly for severe plastic deformation of materials comprising:
    a punch assembly;
    a die set assembly, wherein the die set assembly is configured to produce a billet, and wherein the billet is cylindrically shaped;
    a base assembly, wherein the base assembly comprises a lifting mechanism and a wear plate; and
    a bottom slider assembly, wherein the bottom slider assembly moves laterally in respect to the punch assembly and wherein the bottom slider assembly comprises an ejection ram and is detachable from the base assembly, wherein the bottom slider assembly further comprises a hemi-cylindrical end groove.

* * * * *